Patented Oct. 26, 1954

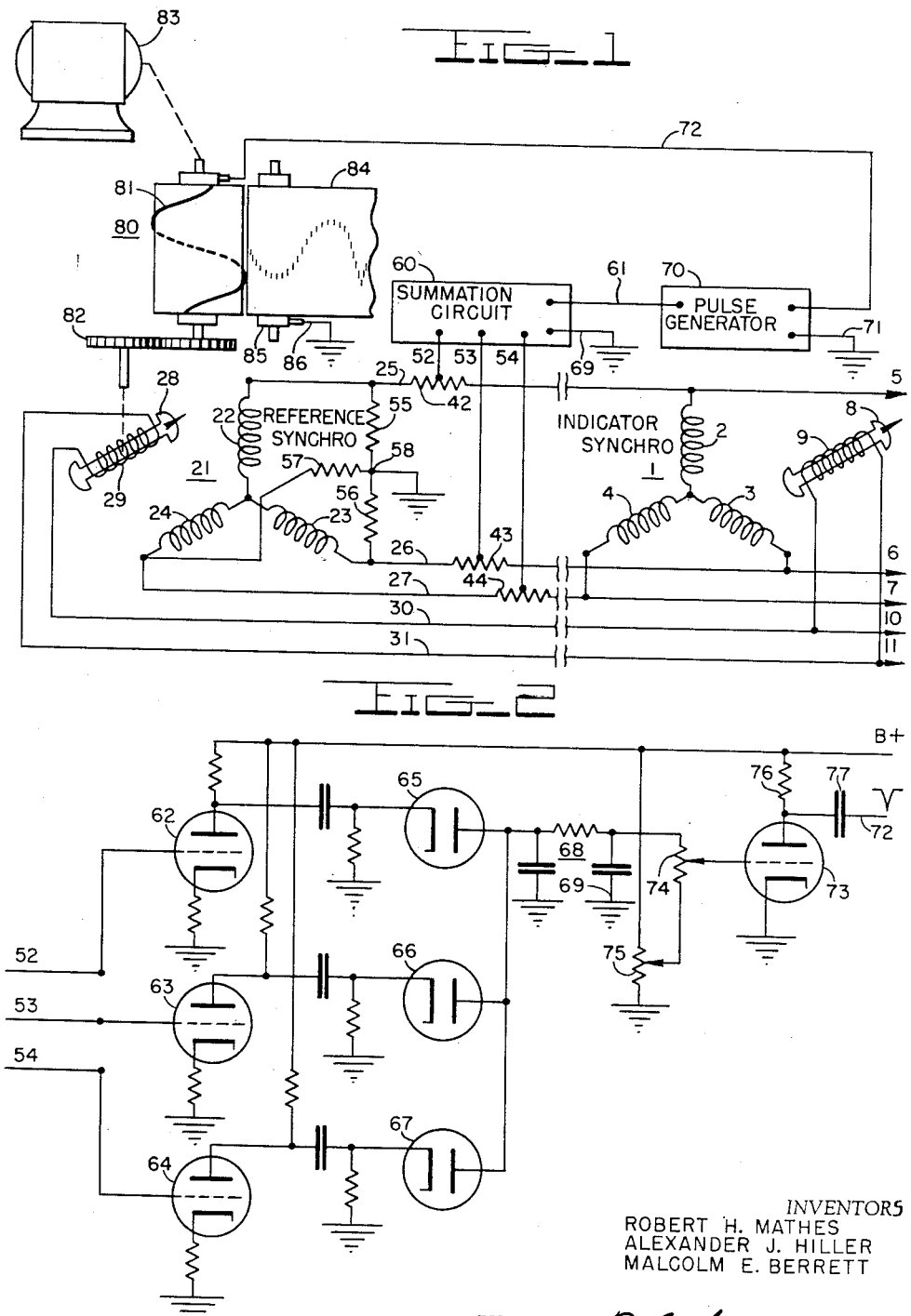

2,692,814

UNITED STATES PATENT OFFICE 2,692,814

POSITION SENSING DEVICE

Robert H. Mathes, Washington, D. C., and Alexander J. Hiller, Bladensburg, and Malcolm E. Berrett, Clinton, Md.

Application October 5, 1950, Serial No. 188,634

10 Claims. (Cl. 346—31)

(Granted under Title 35, U. S. Code (1952), sec. 266)

This invention relates to an improved position sensing device. More particularly it relates to improved electrical apparatus for electrically sensing the indication of an alternating current synchronous telemetering receiver.

The present invention finds utility in numerous alternating current synchro data transmission systems and particularly in systems where it is desired to provide a permanent record of the positioning accuracy of a synchro receiver relative to the position of a synchro data transmitter. By way of example, in gunnery it is frequently desired to indicate the degree of accuracy with which a gun turret follows the positioning movements of a gunfire direction system.

Self synchronous electrical data transmission systems, commonly known as synchro systems, are well known in the art of telemetering data in the form of angular rotation from one station electrically to a physically remote station. Such systems often take a form which includes a data transmitting unit, physically coupled to the phenomenon or independent variable being monitored, and a data receiving unit for translating received electrical signals into a mechanical shaft displacement or other display means.

One well known form of synchro system is the five wire system, in which the data transmitting unit is analogous to an alternating current generator. Such a synchro generator may be provided with a wound rotor, excited from an alternating current source, and a three wire wound stator surrounding the rotor. The rotor shaft is mechanically coupled to the variable being monitored, and rotation of the shaft produces a corresponding rotation of the magnetic field linking rotor and stator, which in turn causes an unsymmetrical distribution of voltages in the three wire stator winding. The three stator windings of the generator are connected by wires to the three corresponding stator windings of a similar unit at the data receiving end of the system. The receiving unit may be considered analogous to an alternating current motor. The wound rotor of the receiving unit or synchro motor is excited by a voltage synchronous with the rotor exciting voltage of the synchro generator, preferably from the same source.

The unsymmetrical distribution of voltages in the three wire synchro generator stator winding produced by the rotation of the generator rotor creates a corresponding rotative displacement of the magnetic field generated by the synchro motor stator windings. Excitation of the rotor winding of the synchro motor creates an additional magnetic field whose direction is dependent on the rotative position of the motor rotor. When the motor stator magnetic field and motor rotor magnetic field are not in alignment, reaction between the two magnetic fields produces a torque which tends to rotate the moveable field associated with the rotor to bring the two fields into alignment. Provided the torque thus created is sufficient to overcome the friction, inertia, and other forces resisting rotation of the motor rotor, the rotor will assume a new position which corresponds to and provides a visual indication of the rotative position of the synchro generator rotor, and hence of the independent variable or phenomenon being monitored. The details of such an alternating current synchro data transmission system are quite well known in the prior art, and it is therefore considered unnecessary to describe them further here.

One undesirable characteristic of a synchro data transmission system such as that described above is the inability to produce a large torque at the synchro motor for a small rotative displacement of the rotor of the synchro generator. This means that unless the synchro motor rotor is designed especially to have low inertia and low resistance to a rotative force, it will not adequately respond to received signals created by small displacements of the synchro generator rotor. Under such conditions the synchro motor rotor would not provide a completely accurate indication of the generator rotor position, but, after a fresh displacement of the generator rotor, would indicate a value slightly inaccurate until the misalignment between the motor stator magnetic field and the motor rotor magnetic field becomes sufficient to produce a torque large enough to overcome the rotor resistance.

One method known to the art to transmit data from the synchro generator unit at the data measuring station to more than one physically remote station, is to connect additional synchro motors into the system in parallel with the first. However, the inaccuracies above described in the alignment between the rotor of the transmitting unit, or synchro generator, and the rotor of the receiving unit, or synchro motor, are greatly increased by the addition of more synchro motors to the system. This is because the power available from the synchro generator is equally apportioned among the several synchro motors, and for a given amount of misalignment, less correcting torque is available at each motor.

One object of our invention is to provide a device for indicating, recording, or otherwise displaying the angular rotative position of either data indicating synchro in such a synchro data transmission system at a station remote from any of the elements of the system, without subtracting from the torque available to the original synchro motor or loading the original system with additional synchro motors, or without increasing the inaccuracies above described.

Another object is to provide an electrical device for sensing the angular position of a synchro unit in a synchro data transmission system without adding more than a negligible load to the system.

Another object of our invention is to provide electrical means for accurately transferring data from a low torque synchro data indicating system to a remote high torque data indicating system, while adding negligible loading to the low torque system.

Other objects and features of the present invention will appear more fully hereinafter from the following detailed description considered in connection with the accompanying drawings which disclose one embodiment of the invention. It is expressly understood, however, that the drawings are designed for purposes of illustration only, and not as a definition of the limits of the invention, reference for the latter purpose being had to the appended claims.

In the drawings wherein like reference characters refer to like elements in all the figures:

Fig. 1 shows a general schematic diagram of our invention as it may be used with a recorder to provide a permanent record of the data transmitted by a synchro data transmission system.

Fig. 2 shows a schematic diagram of a preferred form of signal voltage generating circuit used in our invention.

Briefly stated, our invention consists in connecting in a novel manner a synchro motor into the synchro data transmission system from which it is desired to distribute information. The connection is made by tying the stator windings of the additional unit through large isolating resistances to the stator windings of a data indicating synchro unit already in the system. We have found that if such a connection is made and if the rotor of the new synchro motor is rotated by an outside source, measurement and combination of the respective currents between corresponding stator windings in a particular manner will provide a signal voltage from which can be determined the exact position of the rotor of the synchro motor being monitored. By virtue of the large isolating resistances in the connection between the stator windings of the two synchro units, an extremely small amount of current can flow in the connecting leads, and therefore a negligible amount of loading is placed upon the original data transmitting system.

Turning now to Fig. 1 there is shown a synchro unit 1 provided with three stator windings 2, 3 and 4, connected as at 5, 6 and 7 to a conventional synchro data transmitting system, the remainder of which is not shown. Rotor 8 of unit 1 is provided with winding 9 connected as at 10 and 11 to the rotor energizing source of the data transmission system. Together the leads 5, 6, 7, 10 and 11 make up what is conventionally known as a five-wire synchro data transmitting system.

For convenience in describing our invention the synchro unit 1 will be referred to as the indicator synchro, since it is a synchro unit which normally serves to provide an indication of the data being transmitted in the data transmitting system.

At a physically remote station where it is desired to repeat the information displayed by the indicator synchro, there is provided a second synchro unit 21, which will henceforth be referred to as the reference synchro. The reference synchro 21 is similar in all respects to the indicator synchro 1, and is provided with three stator windings 22, 23 and 24 which are connected as at 25, 26 and 27 to the corresponding stator windings of the indicator synchro. The reference synchro is provided with a rotor 28 having a winding 29 connected by leads 30 and 31 in parallel with leads 10 and 11 to the common rotor exciting source of the data transmitting system.

In each of the three leads connecting the respective stator windings there is provided a large isolating resistance, respectively 42, 43 and 44. These isolating resistances 42, 43 and 44 should be large enough to minimize the loading effect of the reference synchro on the indicator synchro, and yet small enough to permit easily measurable currents to flow between respective stator windings of the two synchros. A convenient and preferred way of measuring the currents in the respective leads between corresponding stator windings of the reference and indicator synchros is to measure the voltage across corresponding impedances in the three respective stator-to-stator leads 25, 26 and 27. Center tapped from the three resistances 42, 43 and 44, therefore, are leads 52, 53 and 54, which serve as input connections to a summation circuit 60, to be described hereinafter.

In order to correlate the voltages obtained at these center taps it is necessary to measure the voltage of each stator-to-stator lead with respect to a voltage point electrically symmetrically to all three leads 25, 26 and 27. Such a symmetrical voltage point would, of course, be the point of connection of the three stator windings 22, 23 and 24. However, the construction of conventional synchros makes this connection point of the three stator windings inaccessible as a practical matter, and so a phantom symmetrical voltage point has been provided by connecting equal resistances 55, 56 and 57, from each of the respective stator windings 22, 23 and 24, to a common point 58 which is grounded. Resistances 55, 56 and 57 should be large enough to draw negligible current through the isolating resistances 42, 43 and 44 relative to stator windings 22, 23 and 24.

Summation circuit 60 is connected as at 61 to a pulse generating circuit 70 to be described hereinafter. The output of pulse generating circuit 70 is a voltage with respect to ground terminal 71 and is connected as at 72 to the signal voltage terminal of a conventional recorder 80, shown in Fig. 1 as of the helical type.

The rotation of the helical recording element 81 of recorder 80 is synchronized by suitable one-to-one gearing 82 with the rotor 28 of the reference synchro. Thus rotor 28 and helical recording element 81 are driven together by the recorder driving motor 83.

As in conventional helical recorders, a recording medium such as an electro-sensitive paper 84 may be caused to travel at a constant rate past the rotating helical recording element. Underneath the paper there is provided an electrically conducting supporting roller 85. If roller 85 is grounded, as at 86, a voltage to ground, such as the output of pulse generator 70, when supplied to the helical recording element 81, will be discharged through the electro sensitive paper and produce a mark thereon. The distance of the mark from an edge of the electro sensitive paper 84 will be determined by the orientation of the helical recording element 81 relative to the conducting roller 85 at the time the mark is made. In other words this distance may be translated into degrees of rotation of the helical recording element relative to some fixed reference orientation.

It will be apparent therefore that since the record produced on the electro sensitive paper 84 can be related to the orientation of the helical recording element 81, and since this helical recording element 81 is connected directly to rotor 28 of the reference synchro 21, then the record on the recording paper can be related to the rotative position of rotor 28 of the referenec synchro 21. If now the helical recording element 81 and the rotor 28 are driven at constant speed, and a signal voltage pulse is generated at pulse generator 70 at a particular instant, the position of the mark produced on the recording paper 84 with respect to the edge of the recording paper will provide a measure of the rotative position of synchro rotor 28 at the instant that the pulse was generated. We have found that by means of a suitable electric circuit, deriving its input from the currents between stator windings of the reference and indicator synchros, the time of generation of the signal voltage pulse output of pulse generator 70 can be related to the relative angular position between synchro rotor 8 and synchro rotor 28. It is thus possible to translate the record on the recording paper not only to rotative position of the rotor 28 of the reference synchro, but also to rotative position of the rotor 28 of the indicator synchro which it is desired to monitor.

Turning now to Fig. 2 there is shown a detailed schematic diagram of a preferred form of the summation circuit 60 and the pulse generator circuit 70 shown in block diagram in Fig. 1. The three voltages with respect to the phantom ground point 58 obtained at the center taps of the isolating resistances 42, 43 and 44 are alternating current voltages having the same frequency as the rotor exciting source, and an amplitude which varies as rotor 28 is rotated. These voltages are fed to the summation circuit 60 through leads 52, 53 and 54 respectively. Each of these voltages is fed through a class A amplifier and limiter, 62, 63 and 64 respectively. The respective outputs of the amplifier limiters are capacitively coupled to diode rectifiers 65, 66 and 67 respectively, which eliminate the positive half of the respective waveforms. The three diode rectifiers 65, 66 and 67 are provided with a common plate circuit including a resistance and capacitance network 68.

The resistance capacitance network 68, one side of which is grounded as at 69, serves to add and integrate the sum of the three voltages which are the respective outputs of the rectifier tubes, and also acts as a filter for the ripple voltage from the rotor energizing source. Due to the action of the diode rectifiers the output voltage of this network is negative with respect to ground. The amplitude of this output voltage, which is a measure of the currents in leads 25, 26 and 27, decreases nearly to zero at the time when the rotors of the reference and indicator synchros are in a relative position corresponding to the point of normal unstable equilibrium, i. e. displaced relatively 180 space degrees from the position of normal electrical alignment in the absence of the isolating resistances in the stator leads.

The three amplifier limiters 62, 63 and 64 serve the purposes of limiting the voltage output from each of the center tapped isolating resistances 42, 43 and 44, isolating the three stator-to-stator leads 25, 26 and 27 from each other, and since their grids draw no current, preventing unbalance in the three stator windings which would be caused by the current drawn by ordinary load resistors.

The integration of the sum of the three voltages by network 68 has been found to yield a pronounced change in value at only one position of the reference synchro with respect to the indicator synchro. Moreover this position has been found always to occur when the two rotors are displaced 180 space degrees.

The pulse generator circuit includes triode amplifier 73 suitably biased by grid potentiometers 74 and 75 so that the negative output voltage from network 68 keeps it normally cut off. However the bias of amplifier 73 is so adjusted that when the output voltage of network 68 is at its least negative value amplifier 73 conducts, thereby drawing a current through plate load resistor 76. The resulting drop in plate voltage of tube 73 is coupled as a signal voltage through capacitor 77 and connecting lead 72 to the recording element 81 of the recording device.

It may thus be seen that in the operation of the device above described, rotation of the rotor of the reference synchro 1, in synchronism with the recording element of the recording device, produces a periodic variation in the integrated voltage output of the summation circuit 60, which integrated voltage passes through a distinctive minimum only once during a 360 degree rotation of the reference synchro rotor, and that this point coincides with a rotative position of the reference synchro rotor 28 which is 180 degrees out of normal electrical alignment with the indicator synchro rotor 8. Marking the recording paper at this instant provides a permanent record which, as stated above, can be related to the rotative position of the reference synchro rotor, and hence of the indicator synchro rotor. It will be apparent that even were the synchros 1 and 21 to be connected in the conventional manner, only a very low torque output could be obtained from rotor 28. However with the arrangement shown, the fact that motor 83, an external power source, drives rotor 28 enables the transfer of data from the conventional synchro system including indicator synchro 1 to a system requiring high input torque, such as recording element 81, which could not be driven by rotor 28 alone.

By virtue of the large isolating resistances 42, 43 and 44 connecting the respective stator windings, an extremely small current flows between corresponding windings of the reference and indicator synchros even when the rotors are far from electrical alignment. Thus a negligible amount of loading is put on the indicator synchro, or the remainder of the data transmission system of which it is a part, by the position sensing device herein described.

Although only one embodiment of the present invention has been disclosed and described herein, it is expressly understood that various changes and substitutions may be made therein without departing from the spirit of the invention as well understood by those skilled in the art. Reference therefore should be had to the appended claims for a definition of the limits of the invention.

The invention described herein may be manufactured and used by or for the Government of the United States of America for governmental purposes without the payment of any royalties thereon or therefor.

What is claimed is:

1. A device for electrically sensing the indication of an indicator unit in a synchro data transmission system comprising a reference synchro unit having stator and rotor windings, one of said windings being polyphase connected, high resistance means connecting each winding of the polyphase connected winding of said reference synchro with the respective winding of said indicator synchro, equal resistance means connecting each winding of the polyphase connected winding of said reference synchro to a common ground point, means rotating the rotor of said reference synchro, means deriving the sum of the voltages from the center point of each of said high resistances to said ground point as said rotor is rotated, and means operative responsive to said summation voltage reaching a minimum value to indicate the rotative position of said reference synchro.

2. A device for electrically sensing the position of a first synchro unit in a synchro data transmission system comprising a second synchro unit having stator and rotor windings, one of said windings being polyphase connected, high resistance means connecting each winding of the polyphase connected winding of said second synchro unit with the respective winding of said first synchro unit, means rotating the rotor of said second synchro unit, means deriving the sum of the voltages from the center point of each of said high resistance means to a point common to the polyphase connected winding of said second synchro unit as said rotor is rotated, means operative responsive to said sum passing through a minimum to generate an output signal, and an indicating device for displaying said output signal.

3. A device for electrically sensing and recording the indication of an indicator unit in a synchro data transmission system comprising a reference synchro unit having stator and rotor windings, one of said windings being polyphase connected, high resistance means connecting each winding of the polyphase connected winding of said reference synchro with the respective winding of said indicator synchro, equal resistance means connecting each winding of the polyphase connected winding of said reference synchro to a common ground point, means rotating the rotor of said reference synchro, means deriving the sum of the voltages from the center point of each of said high resistances to said ground point as said rotor is rotated, a recording device including a recording medium and a recording element movable relative thereto, means for moving said recording element in synchronism with said rotor, and means operative responsive to said summation voltage reaching a minimum value to actuate said recording element.

4. A device for electrically sensing the indication of an indicator synchro unit in a synchro data transmission system comprising a reference synchro unit having stator and rotor windings, one of said windings being polyphase connected, high resistance means connecting each winding of the polyphase connected winding of said reference synchro with the respective winding of said indicator synchro, means rotating the rotor of said reference synchro, means deriving a signal proportional to the summation of the currents in said high resistance means, and means operative responsive to said summation signal reaching a minimum value to indicate the rotative position of said reference synchro.

5. A device for electrically sensing and recording the indication of an indicator synchro unit in a synchro data transmission system comprising a reference synchro unit having stator and rotor windings, one of said windings being polyphase connected, high resistance means connecting each winding of the polyphase connected winding of said reference synchro with the respective winding of said indicator synchro, means rotating the rotor of said reference synchro, means deriving a signal proportional to the summation of the currents in said high resistance means, a recording device including a recording medium and a recording element movable relative thereto, means for moving said recording element in synchronism with said rotor, and means operative responsive to said summation signal reaching a minimum value to actuate said recording element.

6. A device for electrically sensing the position of a first synchro unit in a synchro data transmission system comprising a second synchro unit having stator and rotor windings, one of said windings being polyphase connected, high resistance means connecting each winding of the polyphase connected winding of said second synchro unit with the respective winding of said first synchro unit, means rotating the rotor of said second synchro unit, means deriving the sum of the voltages from the center point of each of said high resistance means to a point common to the polyphase connected winding of said second synchro unit as said rotor is rotated, means operative responsive to said sum passing through a minimum to generate an output signal, a recording device including a recording medium and a recording element movable relative thereto, means for moving said recording element in synchronism with said rotor, and means operative responsive to said output signal to actuate said recording element.

7. A device for electrically sensing the position of a first synchro unit in synchro data a transmission system comprising a second synchro unit having stator and rotor windings, one of said windings being polyphase connected, high resistance means connecting each winding of the polyphase connected winding of said second synchro unit with the respective winding of said first synchro unit, means rotating the rotor of said second synchro unit, means deriving the sum of the currents from the center point of each of said high resistance means to a point common to the polyphase connected winding of said second synchro unit as said rotor is rotated, means operative responsive to said sum passing through a minimum to generate an output signal, and a recording device including a recording medium and a recording element operative responsive to said output signal to mark said recording medium.

8. A device for electrically sensing the position of a first synchro unit in a synchro data transmission system comprising a second synchro unit having stator and rotor windings, one of said windings being polyphase connected, high resistance means connecting each winding of the polyphase connected winding of said second synchro unit with the respective winding of said first synchro unit, means rotating the rotor of said second synchro unit, means deriving the sum of the currents from the center point of each of said high resistance means to a point common to the polyphase connected winding of said second synchro unit as said rotor is rotated, means operative responsive to said sum passing through a minimum to generate an output signal, a recording device including a recording medium and a recording element movable relative thereto, means for moving said recording element in synchronism with said rotor, and means operative responsive to said output signal to actuate said recording element.

9. In combination with a synchro data transmission system including a plurality of synchro units each having a rotor and a stator and having interconnected stator windings and rotor windings energized from a common alternating current voltage source, means for sensing the data transmitted by said system in terms of the rotative position of one of said synchro units comprising a reference synchro unit, high resistance means connecting each stator winding of said reference synchro with its respective stator winding of said one synchro, means rotating the rotor of said reference synchro, means deriving a signal proportional to the summation of the currents in said high resistance means, and means operative responsive to said summation signal reaching a minimum value to indicate the rotative position of said reference synchro.

10. A device for transferring data from a low torque synchro data indicating system to a remote high torque data indicating system comprising a reference synchro unit having stator and rotor windings, one of said windings being polyphase connected, high resistance means connecting each winding of the polyphase connected winding of said reference synchro with the respective winding of an indicator synchro in said synchro data indicating system, means rotating the rotor of said reference synchro, means deriving a signal proportional to the summation of the currents in said high resistance means, a recording device including a recording medium and a high input torque recording element movable relative thereto, high torque means for moving said recording element in synchronism with said rotor, and means operative responsive to said summation signal reaching a minimum value to actuate said recording element for marking said recording medium.

References Cited in the file of this patent

UNITED STATES PATENTS

| Number | Name | Date |
|---|---|---|
| 1,895,942 | Rowell | Jan. 31, 1933 |
| 2,176,102 | Riggs | Oct. 17, 1939 |
| 2,356,186 | Somers | Aug. 22, 1944 |
| 2,414,924 | Borden | Jan. 28, 1947 |
| 2,420,193 | Rich | May 6, 1947 |
| 2,432,772 | Lear | Dec. 16, 1947 |
| 2,439,414 | Agins | Apr. 13, 1948 |
| 2,449,083 | Muir | Sept. 14, 1948 |
| 2,466,687 | Craddock et al. | Apr. 12, 1949 |
| 2,500,746 | Ellenberger | Mar. 14, 1950 |
| 2,549,829 | Lilja et al. | Apr. 24, 1951 |
| 2,574,104 | Ireland | Nov. 6, 1951 |

FOREIGN PATENTS

| Number | Country | Date |
|---|---|---|
| 344,135 | Germany | Nov. 17, 1921 |